(12) United States Patent
Chang et al.

(10) Patent No.: US 8,113,781 B2
(45) Date of Patent: Feb. 14, 2012

(54) FAN, MOTOR AND BUSHING THEREOF

(75) Inventors: Hui-Chun Chang, Taoyuan Hsien (TW); Yi-Fang Chou, Taoyuan Hsien (TW); Li-Chen Lin, Taoyuan Hsien (TW)

(73) Assignee: Delta Electronics, Inc., Taoyuan Hsien (TW)

(*) Notice: Subject to any disclaimer, the term of this patent is extended or adjusted under 35 U.S.C. 154(b) by 1043 days.

(21) Appl. No.: 12/027,893

(22) Filed: Feb. 7, 2008

(65) Prior Publication Data
US 2009/0052820 A1 Feb. 26, 2009

(30) Foreign Application Priority Data
Aug. 24, 2007 (TW) .............................. 96131429 A

(51) Int. Cl.
*F01D 25/16* (2006.01)
(52) U.S. Cl. .................... 416/174; 416/244 R; 415/111; 415/229
(58) Field of Classification Search .................. 416/174, 416/244 R; 415/111, 229
See application file for complete search history.

(56) References Cited

U.S. PATENT DOCUMENTS

| | | | | |
|---|---|---|---|---|
| 3,911,659 A * | 10/1975 | Mandl | ............................. | 57/406 |
| 4,336,470 A * | 6/1982 | Gutris | .................... | 310/216.133 |
| 4,612,468 A * | 9/1986 | Sturm et al. | ................. | 310/67 R |
| 4,638,201 A * | 1/1987 | Feigel | .................... | 310/216.098 |
| 5,258,676 A * | 11/1993 | Reinhardt et al. | ............ | 310/112 |
| 6,050,786 A * | 4/2000 | Lin | ................ | 417/366 |
| 6,987,336 B2 * | 1/2006 | Streng et al. | .................... | 310/51 |
| 7,737,589 B2 * | 6/2010 | Sekiguchi et al. | ............. | 310/90 |
| 7,859,145 B2 * | 12/2010 | Rapp et al. | ....................... | 310/43 |
| 2007/0098571 A1 | 5/2007 | Nagamatsu | | |

* cited by examiner

*Primary Examiner* — Igor Kershteyn
(74) *Attorney, Agent, or Firm* — Birch, Stewart, Kolasch & Birch, LLP

(57) ABSTRACT

A fan includes an impeller and a motor for driving the impeller to rotate. The motor includes a bushing and a rotating shaft penetrating through the bushing. The bushing includes a tube and at least one base connected with one end of the tube. An inner diameter of the tube is smaller than an inner diameter of the base so that the mechanism design variability is enhanced and the efficiency of the fan and the motor is enhanced by effectively utilizing an inner space of the bushing.

16 Claims, 8 Drawing Sheets

FAN, MOTOR AND BUSHING THEREOF

CROSS REFERENCE TO RELATED APPLICATIONS

This Non-provisional application claims priority under 35 U.S.C. §119(a) on Patent Application No(s). 096131429, filed in Taiwan, Republic of China on Aug. 24, 2007, the entire contents of which are hereby incorporated by reference.

BACKGROUND OF THE INVENTION

1. Field of Invention

The present invention relates to a fan, a motor and a bushing thereof each having the enhanced efficiency.

2. Related Art

With the enhancement of functions and operations of electronic products, heats generated by the electronic products are also increased. In order to keep the normal operation of the electronic products, a fan is often utilized to dissipate the heat.

As shown in FIG. 1, a conventional fan 1 has a motor 10 for driving an impeller 11 to rotate. In order to make the motor 10 rotate smoothly, a bearing 12 is usually disposed in a bushing 13 and covers a rotating shaft 14. Thus, the rotating shaft 14 can rotate via the support of the bearing 12.

The current bushing 13 usually has a hollow straight cylindrical shape and is configured such that the rotating shaft 14 can penetrate through the bushing 13 and the space for accommodating the beating 12 is also provided. However, the diameter of the section of the hearing 12 is usually greater than the diameter of the section of the rotating shaft 14. So, the diameter of the section of the bushing 13 is far greater than the diameter of the section of the rotating shaft 14. Consequently, the inner space of the bushing 13 is wasted.

SUMMARY OF THE INVENTION

In order to enhance the efficiency of the fan, to enhance the availability of the inner space of the conventional fan, to enhance the efficiency of the motor and to decrease the power consumption, the present invention is to provide a bushing having an inner space, which may be effectively utilized to enhance the variability of the mechanism design and thus to enhance the efficiency of the fan and the motor. The present invention is also to provide a fan using the bushing to enlarge the air passage, to enhance the efficiency of the motor, and thus to improve the efficiency of the fan.

To achieve the above, the present invention discloses a bushing including a tube and at least one base. Both ends of the tube are connected with the base. The tube and the base are integrally formed as a single unit. An inner diameter of the tube is smaller than an inner diameter of the base.

To achieve the above, the present invention also discloses a motor including a bushing and a rotating shaft penetrating through the bushing. The bushing includes a tube and at least one base. The base is connected with one end of the tube, and an inner diameter of the tube is smaller than an inner diameter of the base.

In addition, the present invention further discloses a fan including an impeller and a motor. The motor is used for driving the impeller to rotate. The motor includes a bushing and a rotating shaft penetrating through the bushing. The bushing includes a tube and at least one base connected with one end of the tube. An inner diameter of the tube is smaller than an inner diameter of the base.

In summary, the tube and the base of the bushing of the present invention have different inner diameters, and the inner diameter of the tube is smaller than the inner diameter of the base. In addition to the position wherein the bearings are disposed, the inwardly shrunken space of the tube can provide more space for other components of the fan so that the overall structure of the impeller is reduced. Compared with the prior art, the present invention can effectively utilize the inner space of the bushing. When the bushing is applied to the fan, the air passage for the airflows can be enlarged so that the efficiency of each of the motor and the fan can be enhanced because the inwardly shrunken space provides the arrangement sizes of other elements. In addition, because the bushing of the present invention can be constituted by assembling two kits together, in the stricture design, the adjustment can be made according to the sizes of other components. Compared with the prior art, the present invention can effectively enhance the flexibility in designing the structure.

BRIEF DESCRIPTION OF THE DRAWINGS

The present invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
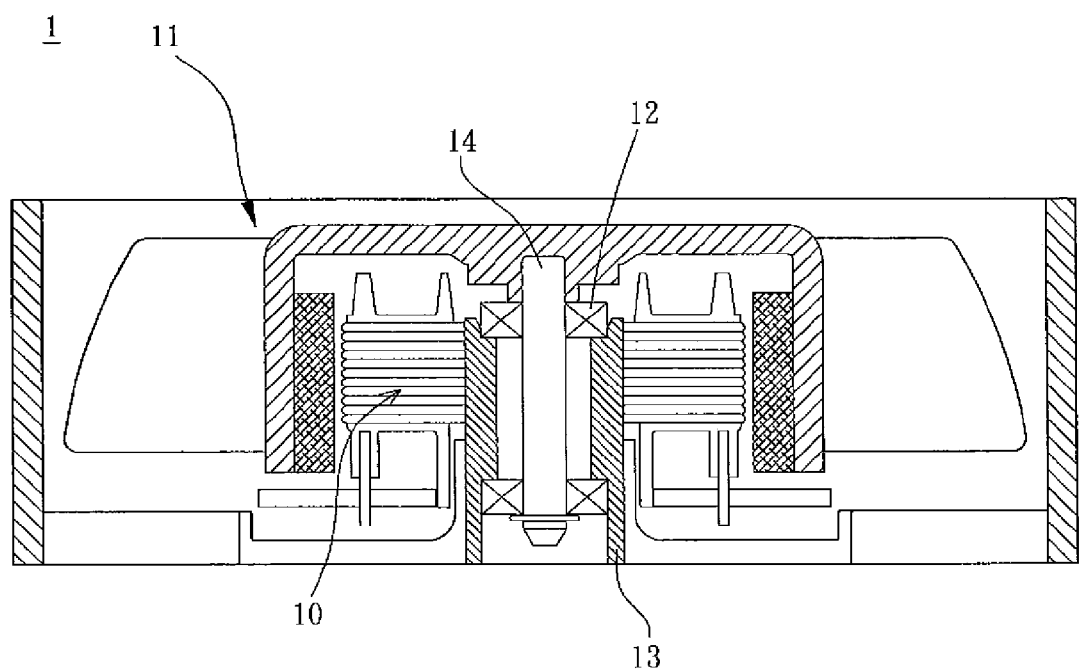
FIG. 1 is a schematic illustration showing a conventional fan.
Figure 2A:
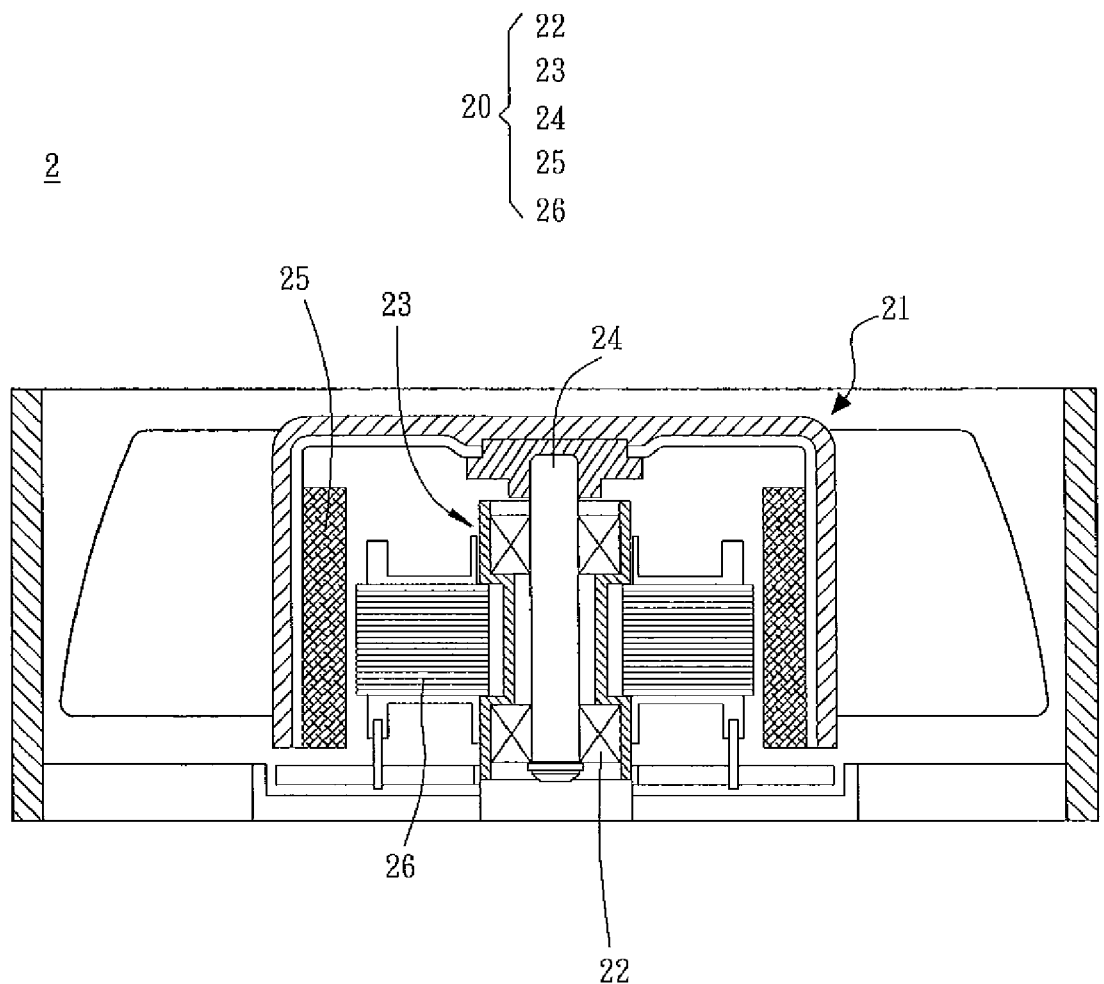
FIG. 2A is a schematic illustration showing a fan according to a preferred embodiment of the present invention.

The present invention is to enhance the efficiency of the fan and to improve the availability of the inner space of the conventional fan. FIG. 2A is a schematic illustration showing a fan according to a preferred embodiment of the present invention. Referring to FIG. 2A, a fan 2 of the present invention mainly includes a motor 20 and an impeller 21. The motor 20 drives the impeller 21 to rotate. The motor 20 includes two bearings 22, a bushing 23, a rotating shaft 24, a magnetic-conducting element 25 and a silicon steel sheet set 26 which is constituted by a plurality of silicon steel sheets. The rotating shaft 24 penetrates through the bushing 23, and the outer side of the bushing 23 is mounted with the silicon steel sheet set 26. The silicon steel sheet set 26 is disposed with respect to the magnetic-conducting element 25.

Figure 2B:
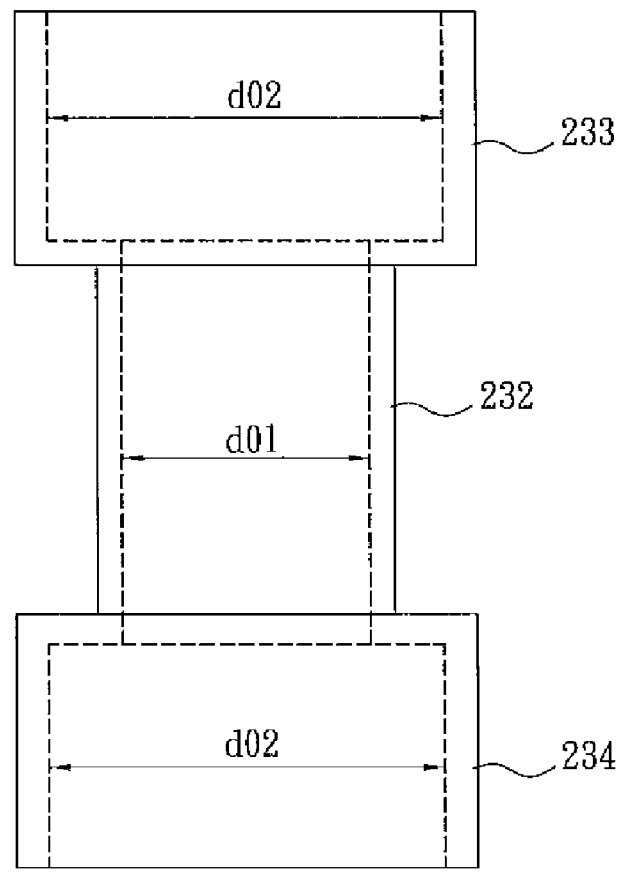
FIG. 2B is a schematically cross-sectional view showing a bushing of FIG. 2A.
Figure 2C:
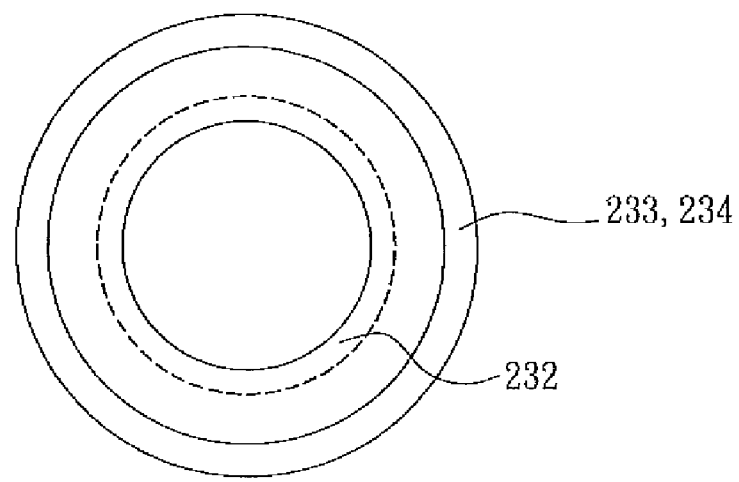
FIG. 2C is a top view showing the bushing of FIG. 2A.

FIG. 2B is a schematically cross-sectional view showing the bushing of FIG. 2A. FIG. 2C is a top view showing the bushing of FIG. 2A. Referring to FIGS. 2A and 2C, the bushing 23 includes a tube 232 and two base 233 and 234.

Two ends of the tube 232 are respectively connected with the bases 233 and 234. The tube 232 and the bases 233 and 234 are integrally formed as a single unit, and an inner diameter d01 of the tube 232 is smaller than an inner diameter d02 of the bases 233 and 234. So, when the bushing 23 is viewed from top, the tube 232 and the bases 233 and 234 can be simultaneously seen, and the tube 232 and the bases 233 and 234 form a shape of concentric circles, as shown in FIG. 2C.

It is to be noted that the bases 233 and 234 have the same inner diameter d02 in this embodiment. However, the bases 233 and 234 may have different inner diameters according to different application occasions.

As mentioned hereinabove, two bearings 22 are respectively mounted with an outer side of the rotating shaft 24 and are respectively accommodated within the bases 233 and 234 of the bushing 23, and the silicon steel sheet set 26 is fixed to the outer side of the tube 232 of the bushing 23. It is to be noted that a portion of space in the conventional single tube-diameter bushing is reduced because the inner diameter d01 of the tube 232 is smaller than the inner diameters d02 of the bases 233 and 234 in this embodiment. Consequently, the size of the external element (e.g., the silicon steel sheet set 26) telescoped with the tube 232 of the bushing 23 can be reduced without influencing the property. According to the inward shrinkage of the bushing 23, the area of the air passage can be increased. Consequently, the output efficiency of the fan 2 can be effectively enhanced. In order to engage and position the silicon steel sheet set 26 by the tube 232, the overall size of the fan 2 may also be minimized. Furthermore, the length of the tube 232 can be changed in conjunction with the silicon steel sheet sets 26 with different thicknesses so that the mechanism design becomes more flexible.

The bushing of this embodiment has the tube and the base with different inner diameters, and the inner diameter of the tube is smaller than the inner diameter of the base. So, in addition to the position where the bearings are disposed, the inwardly shrunken space of the tube can provide more space for other components of the fan so that the diameter of the hub can be reduced, the space for the elements can be enlarged, the efficiency of the motor can be enhanced, and the power consumption can be decreased. Compared with the prior art, the present invention effectively utilizes the inner space of the bushing. When the bushing is applied to the fan, the air passage for the airflows is enlarged so that the efficiency of the motor and the efficiency of the fan can be increased.

Figure 3A:
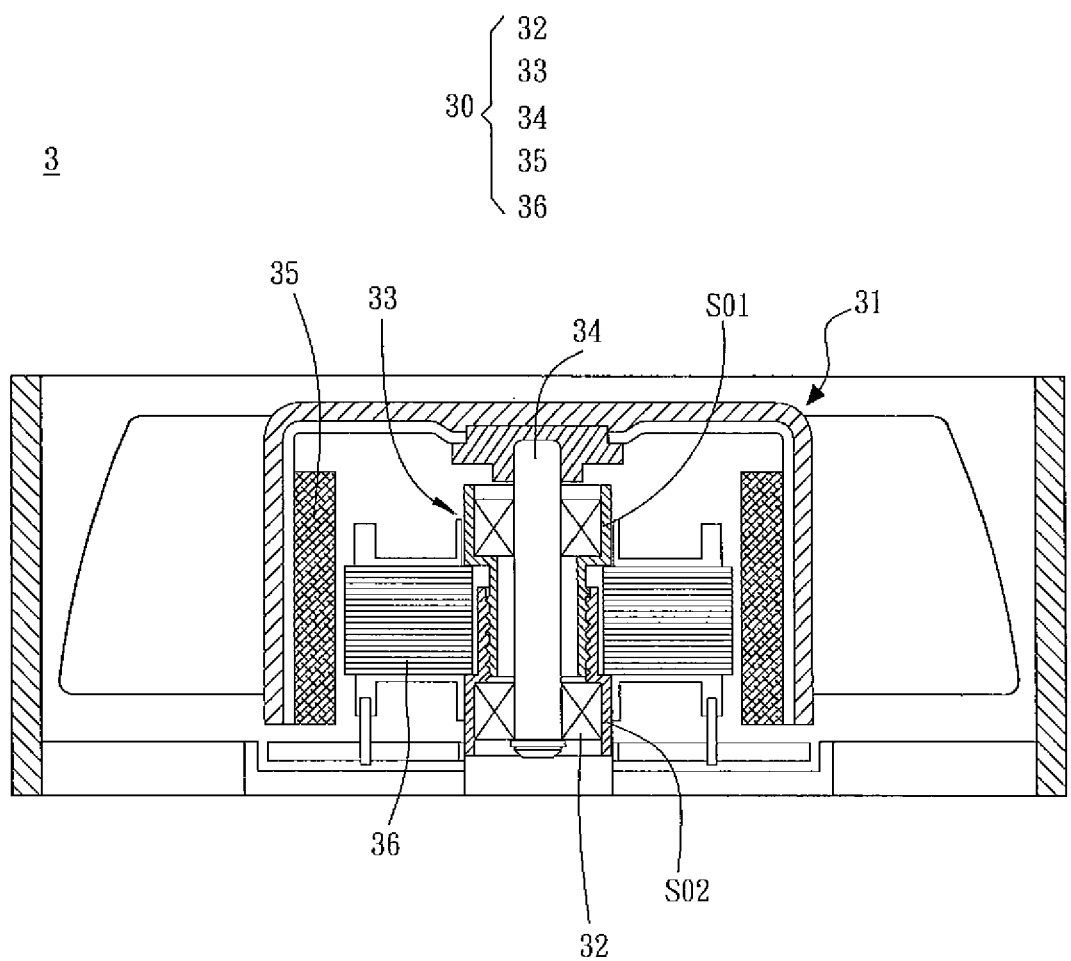
FIG. 3A is a schematic illustration showing another fan according to the preferred embodiment of the present invention.
Figure 3B:
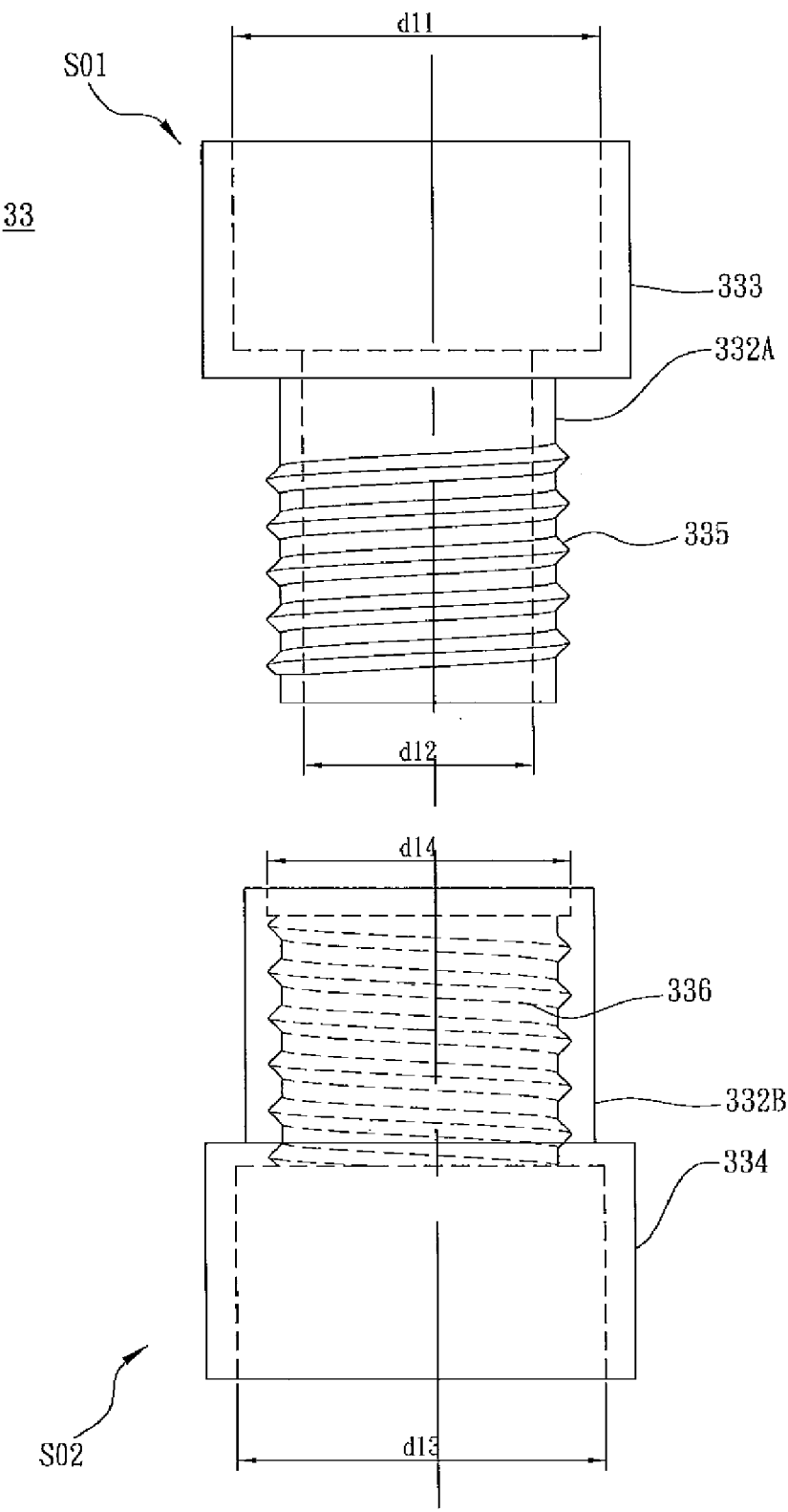
FIG. 3B is a schematically cross-sectional view showing a bushing of FIG. 3A.

It is to be noted that the bushing 23 of the present invention is not restricted to have the tube and the base as being integrally formed as a single unit. The bushing of the present invention may also be formed by assembling two kits with each other. FIG. 3A is a schematic illustration showing another fan according to the preferred embodiment of the present invention. FIG. 3B is a schematically cross-sectional view showing a bushing of FIG. 3A.

Referring to FIG. 3A, what is similar to the fan of the first embodiment of FIG. 2A is that a fan 3 includes a motor 30 and an impeller 31. The motor 30 drives the impeller 31 to rotate. The motor 30 includes two bearings 32, a bushing 33, a rotating shaft 34, a magnetic-conducting element 35 and a silicon steel sheet set 36. The rotating shaft 34 penetrates through the bushing 33, the outer side of the bushing 33 is mounted with the silicon steel sheet set 36, and the silicon steel sheet set 36 is disposed with respect to the magnetic-conducting element 35.

What is different from the bushing 23 of FIG. 2A is that the bushing 33 of FIG. 3A includes a first kit S01 and a second kit S02, which are correspondingly assembled together to form the bushing 33. The first kit S01 has a first base portion 333 and a first tube portion 332A connected with the first base portion 333. The first base portion 333 has a first inner diameter d11, and the first tube portion 332A has a second inner diameter d12 substantially smaller than the first inner diameter d11.

The second kit S02 has a second base portion 334 and a second tube portion 332B connected with the second base portion 334. The second base portion 334 of the second kit S02 has a third inner diameter d13, and the second tube portion 332B has a fourth inner diameter d14 substantially smaller than the third inner diameter d13. In this embodiment, the second inner diameter d12 of the first kit S01 is substantially smaller than the fourth inner diameter d14 of the second kit S02. Thus, when the first kit S01 is combined with the second kit S02, the first tube portion 332A of the first kit S01 is telescoped into the second tube portion 332B of the second kit S02.

Furthermore, as shown in FIG. 3B, a first connecting portion 335 and a second connecting portion 336 are respectively disposed on the first kit S01 and the second kit S02 in this embodiment. Specifically speaking, the first connecting portion 335 of this embodiment is disposed on an outer wall of the first tube portion 332A of the first kit S01, and the second connecting portion 336 is disposed on an inner wall of the second tube portion 332B of the second kit S02. More specifically, the implemented first connecting portion 335 includes, for example, a plurality of external threads, and is integrally formed with the first tube portion 332A of the first kit S01 as a single unit. The threads are separated by a predetermined distance and are disposed on the outer wall of the first tube portion 332A substantially in parallel, and the material of the first connecting portion 335 includes metal, alloy or plastic.

In this embodiment, the second connecting portion 336 is integrally formed with the second tube portion 332B of the second kit S02 as a single unit. In practice, the second connecting portion 336 includes, for example, a plurality of internal threads. The threads are separated by a predetermined distance and are disposed around the inner wall of the second tube portion 332B substantially in parallel. It is to be noted that the second connecting portion 336 is disposed in correspondence with the first connecting portion 335. In other words, when the first kit S01 is telescoped into the second kit S02, the first kit S01 can be tightly telescoped into the second kit S02 because the second connecting portion 336 is disposed in correspondence with the first connecting portion 335.

In this embodiment, the first kit S01 is combined with the second kit S02 by way of rotating, moving, screwing or locking. It is to be specified that the first kit S01 of the bushing 33 is telescoped into the second kit S02 by a depth, which may be properly adjusted according to the thickness of another member (e.g., the silicon steel sheet set 36 in FIG. 3A). When the silicon steel sheet has the greater thickness, the first kit S01 may be rotated to the proper position according to the thickness of the silicon steel sheet. That is, the first kit S01 is telescoped into the second kit S02 by a depth, which may be determined according to an additional member provided to design the fixed positions of the first connecting portion and the second connecting portion.

Figure 4:
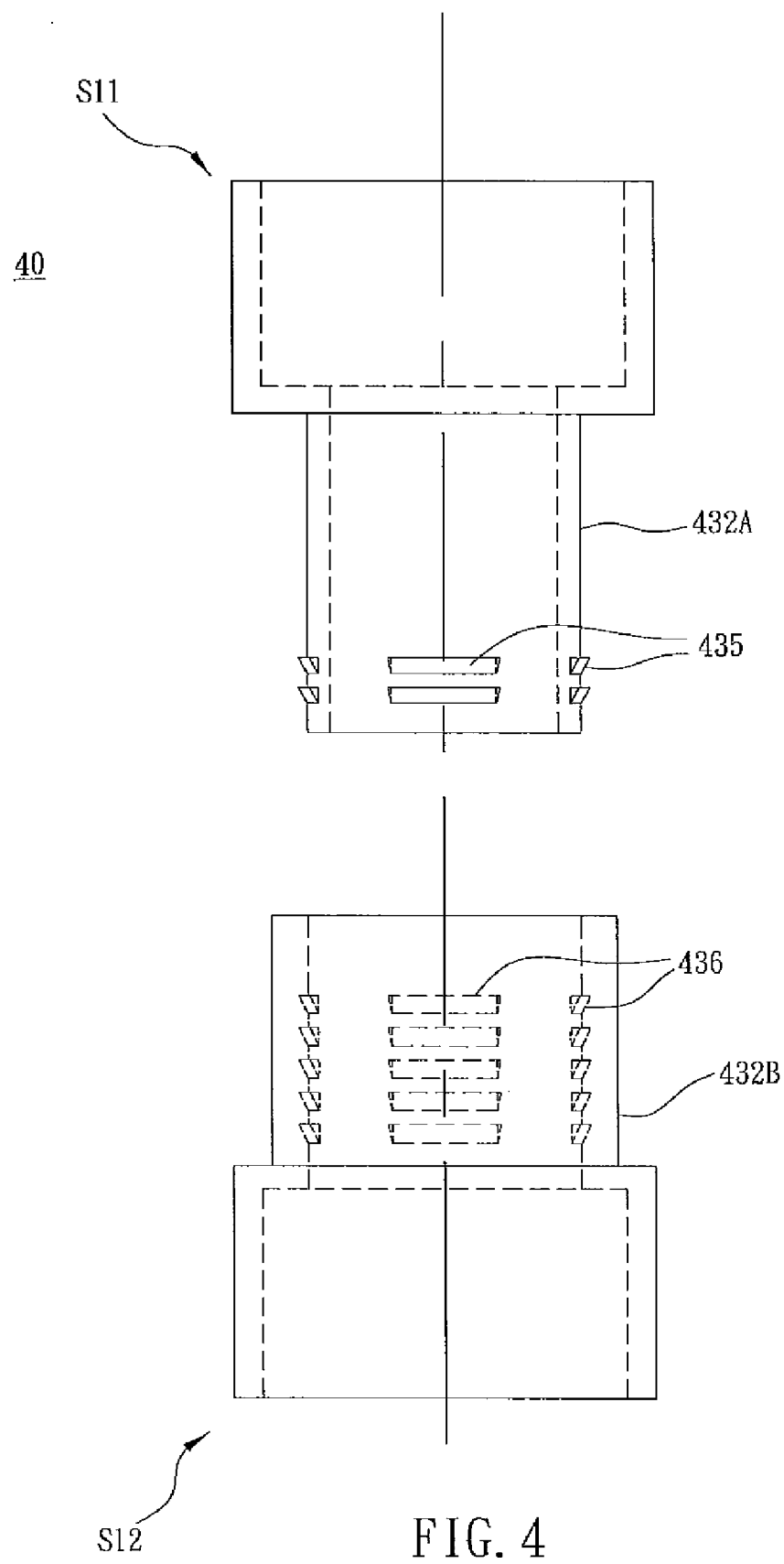
FIGS. 4 and 5A are schematic illustrations showing another two bushings according to the preferred embodiment of the present invention.

In addition, the assembling way of the first kit S01 and the second kit S02 is not limited thereto. FIG. 4 shows another bushing 43 according to the preferred embodiment of the present invention. In FIG. 4, a first connecting portion 435 is a hook having the elastic allowance, and the first connecting portion 435 is disposed on an outer wall of a first tube portion 432A of a first kit S11. When more than two books are disposed on the outer wall of the first tube portion 432A of the first kit S11, the hooks are separated by a fixed distance or different distances and are disposed around the outer wall of the first tube portion 432A of the first kit S11. In addition, a second connecting portion 436 is a slot, which is disposed on an inner wall of a second tube portion 432B of a second kit S12. The first connecting portion 435 is disposed in correspondence with the second connecting portion 436. So, when the second kit S12 is assembled with the first kit S11, the first connecting portion 435 is firstly pressed until the first connecting portion 435 touches the corresponding second connecting portion 436. Then, the first connecting portion 435 is released and engages with the second connecting portion 436. As the result, the first kit S11 can be tightly telescoped into the second kit S12.

In this embodiment, the first kit S11 is telescoped into the second kit S12 by a depth, which may be properly adjusted according to the thickness of another component, such as the thickness of the silicon steel sheet set 36 in FIG. 3A. The first connecting portion 435 may be combined with the second connecting portion 436 at different positions of the first tube portion 432A and the second tube portion 432B so that the lengths of the first tube portion 432A and the second tube portion 432B can be adjusted when the first kit S11 is connected with the second kit S12. In this embodiment, the first kit S11 and the second kit S12 are combined by way of moving or engaging, for example.

Figure 5A:
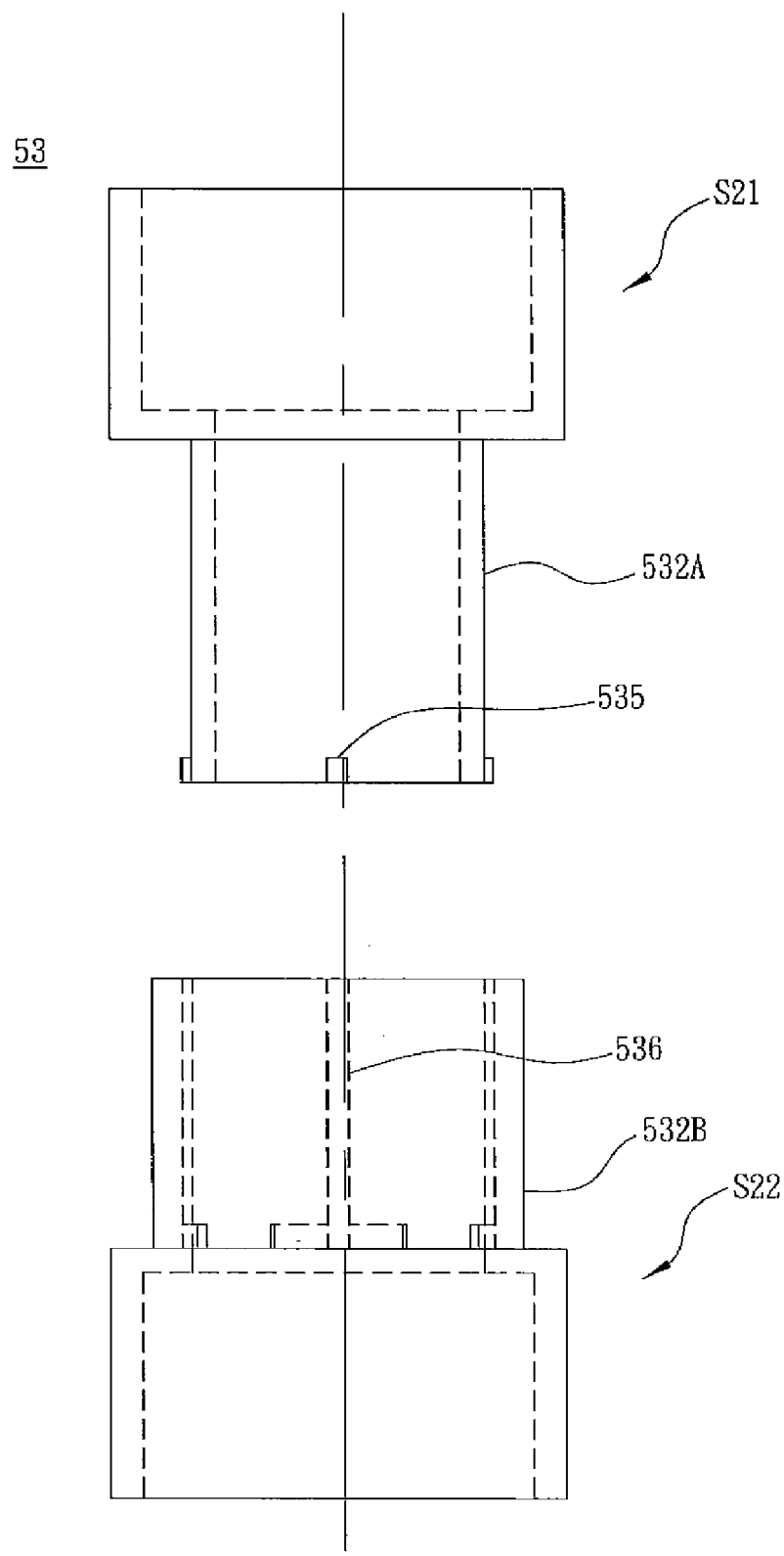
Figure 5B:
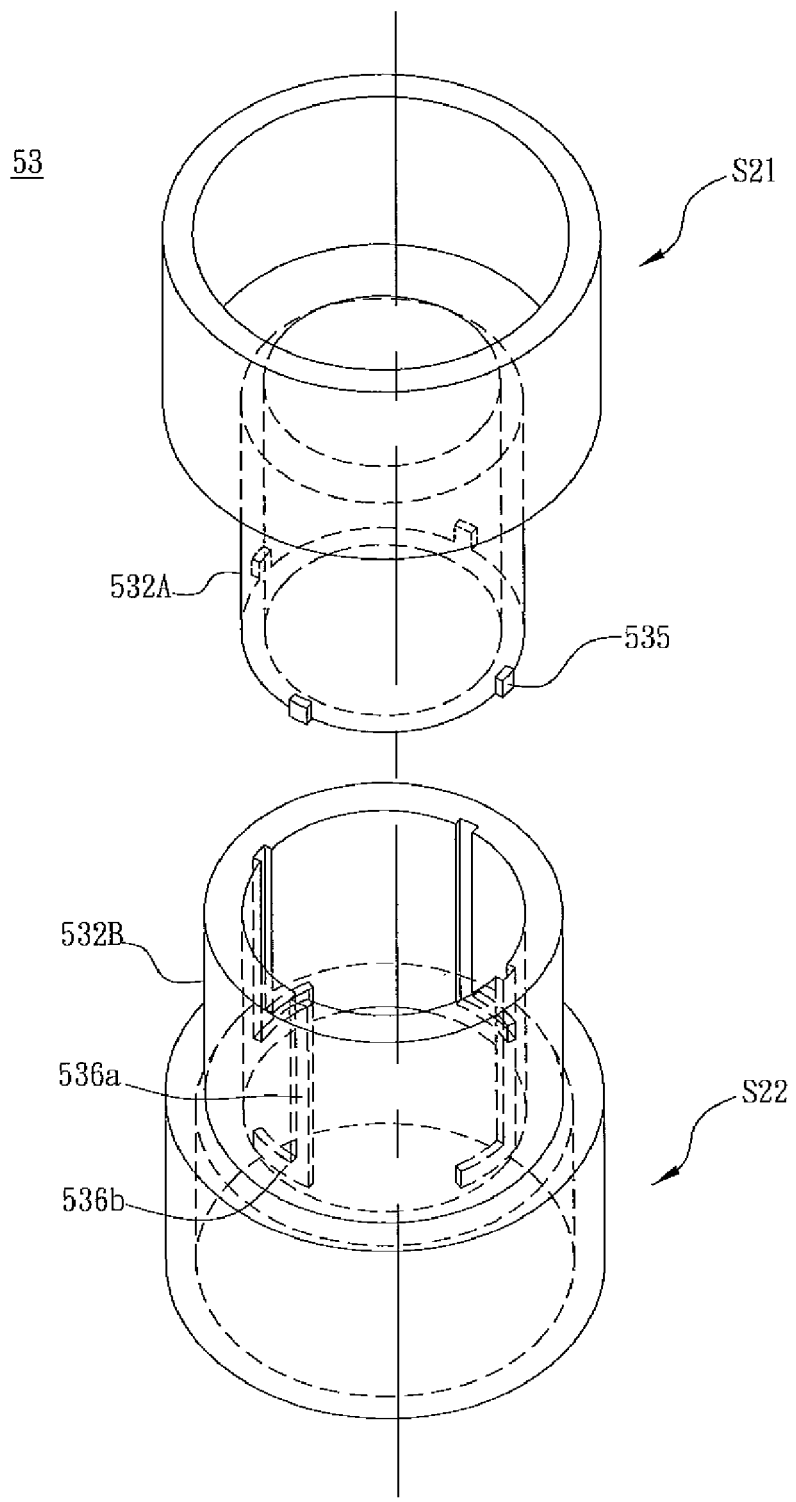
FIG. 5B is a schematic view showing the bushing of FIG. 5A.

FIG. 5A shows one another bushing 53 of the present invention. FIG. 5B is a schematic view showing the bushing 53 of FIG. 5A. In this embodiment a first connecting portion 535 is, for example, a protrusion disposed on an outer wall of a first tube portion 532A of a first kit S21. The first connecting portions 535 may be disposed symmetrically or asymmetrically. A second connecting portion 536 is, for example, a groove disposed on an inner wall of a second tube portion 532B of a second kit S22. The first connecting portion 535 may slide relative to the second connecting portion 536, and the second connecting portion 536 may be engaged with the first connecting portion 535 so that the first kit S21 can be tightly telescoped into the second kit S22. As shown in FIG. 5B, the second connecting portion 536 has a guiding part 536a and an engaging part 536b, which are connected with each other and are substantially vertical. Thus, when the first kit S21 is telescoped into the second kit S22, the first connecting portion 535 firstly slides into the guiding part 536a of the second connecting portion 536 until the first connecting portion 535 reaches to a connection between the guiding part 536a and the engaging part 536b. Meanwhile, an external force is applied so that either the first kit S21 or the second kit S22 is rotated by a predetermined angle relative to the other (a clockwise rotation in FIG. 5B) so as to allow the first connecting portion 535 to slide into the engaging part 536b of the second connecting portion 536. As the result, the first kit S21 is engaged with and combined to the second kit S22.

In summary, the bushing of the present invention has an integrally formed structure or has two kits assembled together, wherein each kit has the base and the tube. The tube and the base of the bushing have different inner diameters, and the inner diameter of the tube is smaller than the inner diameter of the base. In addition to the position wherein the bearings are disposed, the inwardly shrunken space of the tube can provide more space for other components of the fan so that the overall structure of the impeller is reduced. Compared with the prior art, the present invention can effectively utilize the inner space of the bushing. When the bushing is applied to the fan, the air passage for the airflows can be enlarged so that the efficiency of each of the motor and the fan can be enhanced because the inwardly shrunken space provides the arrangement sizes of other elements. In addition, the bushing of the present invention can be constituted by assembling two kits together. Thus, in the structure design, the adjustment can be made according to the sizes of other components. Compared with the prior art, the present invention can effectively enhance the flexibility in designing the structure.

Although the present invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the present invention.

What is claimed is:

1. A bushing, comprising:
 a tube; and
 at least one base connected with one end of the tube, wherein an inner diameter of the tube is smaller than an inner diameter of the base,
 wherein the tube comprises a first tube portion and a second tube portion, the base comprises a first base portion and a second base portion, the first tube portion and the first base portion connected with the first tube portion constitute a first kit, the second tube portion and the second base portion connected with the second tube portion constitute a second kit, and the first kit and the second kit are correspondingly assembled together to form the bushing,
 wherein the bushing further comprises at least one first connecting portion, which is disposed on an outer wall of the first tube portion of the first kit, and
 wherein the bushing further comprises at least one second connecting portion, which is disposed on an outer wall of the second tube portion of the second kit, and the first connecting portion is located with respect to the second connecting portion when the first kit and the second kit are assembled.

2. The bushing according to claim 1, wherein the first base portion has a first inner diameter, the first tube portion has a second inner diameter smaller than the first inner diameter of the first base portion, the second base portion has a third inner diameter, and the second tube portion has a fourth inner diameter smaller than the third inner diameter of the second base portion.

3. The bushing according to claim 1, wherein the first tube portion of the first kit is accommodated within the second tube portion of the second kit, the first base portion has a first inner diameter, the first tube portion has a second inner diameter, the second base portion has a third inner diameter, the second tube portion has a fourth inner diameter, and the second inner diameter of the first tube portion is substantially smaller than the fourth inner diameter of the second tube portion.

4. The bushing according to claim 1, wherein the bushing comprises a plurality of first/second connecting portions, each of which is separated from the adjacent first/second connecting portion by a predetermined distance or different distances, and all of the first/second tube portions are disposed around the outer wall of the first/second tube portion.

5. The bushing according to claim 1, wherein the bushing comprises a plurality of first/second connecting portions, all of the first/second tube portions are disposed symmetrically or asymmetrically.

6. The bushing according to claim 1, wherein the first connecting portion and the first tube portion are integrally formed as a single unit, the second connecting portion and the second tube portion are integrally formed as a single unit, and the first/second connecting portion and the first/second tube portion comprise metal, alloy or plastic.

7. The bushing according to claim 1, wherein the first connecting portion comprises a plurality of external threads and the second connecting portion comprises a plurality of internal threads, and vice versa.

8. The bushing according to claim 1, wherein the first connecting portion is a hook or a protrusion and the second connecting portion is correspondingly a slot or a groove, and vice versa.

9. The bushing according to claim 1, wherein the second connecting portion engages with the first connecting portion after the first connecting portion slides relative to the second connecting portion, and the second connecting portion comprises a guiding part and an engaging part, and the guiding part and the engaging part are connected with each other and are disposed substantially vertically.

10. The bushing according to claim 1, wherein the second connecting portion comprises a guiding part and an engaging part, the guiding part and the engaging part are connected with each other, and when the first kit is telescoped into the second kit, the first connecting portion firstly slides into the guiding part of the second connecting portion until reaching to a connection between the guiding part and the engaging part, and then either the first kit or the second kit is rotated relative to the other so as to allow the first connecting portion to slide into the engaging part of the second connecting portion, whereby the first kit and the second kit being engaged with and combined to each other.

11. The bushing according to claim 1, wherein the first kit and the second kit are combined together by way of screwing, engaging, moving, rotating or locking.

12. The bushing according to claim 1, wherein when the bushing is viewed from top, the tube and the base are seen simultaneously, and the tube and the base form a shape of concentric circles.

13. A motor, comprising:
a bushing and a rotating shaft penetrating through the bushing, wherein the bushing comprises a tube and at least one base, the base is connected with one end of the tube and an inner diameter of the tube is smaller than an inner diameter of the base,
wherein the tube comprises a first tube portion and a second tube portion, the base comprises a first base portion and a second base portion, the first tube portion and the first base portion connected with the first tube portion constitute a first kit, the second tube portion and the second base portion connected with the second tube portion constitute a second kit, and the first kit and the second kit are correspondingly assembled together to form the bushing,
wherein the bushing further comprises at least one first connecting portion, which is disposed on an outer wall of the first tube portion of the first kit, and
wherein the bushing further comprises at least one second connecting portion, which is disposed on an outer wall of the second tube portion of the second kit, and the first connecting portion is located with respect to the second connecting portion when the first kit and the second kit are assembled.

14. The motor according to claim 13, wherein outer sides of the first tube portion and the second tube portion are mounted with a silicon steel sheet set which is constituted by a plurality of silicon steel sheets, and the second kit is telescoped with the first kit by a depth, which is adjustable according to a thickness of the silicon steel sheet set.

15. A fan, comprising:
an impeller; and
a motor for driving the impeller to rotate, wherein the motor comprises a bushing and a rotating shaft penetrating through the bush, the bushing comprises a tube and at least one base connected with one end of the tube, and an inner diameter of the tube is smaller than an inner diameter of the base,
wherein the tube comprises a first tube portion and a second tube portion, the base comprises a first base portion and a second base portion, the first tube portion and the first base portion connected with the first tube portion constitute a first kit, the second tube portion and the second base portion connected with the second tube portion constitute a second kit, and the first kit and the second kit are correspondingly assembled together to form the bushing,
wherein the bushing further comprises at least one first connecting portion, which is disposed on an outer wall of the first tube portion of the first kit, and
wherein the bushing further comprises at least one second connecting portion, which is disposed on an outer wall of the second tube portion of the second kit, and the first connecting portion is located with respect to the second connecting portion when the first kit and the second kit are assembled.

16. The fan according to claim 15, wherein outer sides of the first tube portion and the second tube portion are mounted with a silicon steel sheet set which is constituted by a plurality of silicon steel sheets, and the second kit is telescoped with the first kit by a depth, which is adjustable according to a thickness of the silicon steel sheet set.

* * * * *